(12) United States Patent
Chern et al.

(10) Patent No.: US 9,958,686 B2
(45) Date of Patent: May 1, 2018

(54) OPTICAL APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 140 days.

(21) Appl. No.: 14/952,387

(22) Filed: Nov. 25, 2015

(65) Prior Publication Data

US 2017/0108698 A1    Apr. 20, 2017

(30) Foreign Application Priority Data

Oct. 16, 2015   (CN) .......................... 2015 1 0674152
Oct. 16, 2015   (TW) ............................. 104134040 A (51) Int. Cl.
| | |
|---|---|
| G02B 27/09 | (2006.01) |
| F21V 7/04 | (2006.01) |
| G02B 27/30 | (2006.01) |
| G02B 27/42 | (2006.01) |
| F21Y 101/00 | (2016.01) |

(52) U.S. Cl.
CPC ............ *G02B 27/0905* (2013.01); *F21V 7/04* (2013.01); *G02B 27/30* (2013.01); *G02B 27/425* (2013.01); *F21Y 2101/00* (2013.01)

(58) Field of Classification Search
CPC .. G02B 27/0905; G02B 27/425; G02B 27/30; F21V 7/04; F21Y 2101/00
See application file for complete search history.

(56) References Cited

U.S. PATENT DOCUMENTS

| | | | | |
|---|---|---|---|---|
| 7,561,322 B1* | 7/2009 | Maeda | ................. | G03B 21/005 359/290 |
| 2009/0016400 A1* | 1/2009 | Lee | ..................... | G02B 27/0905 372/100 |
| 2012/0236288 A1* | 9/2012 | Stanley | .............. | G01B 11/2513 356/4.01 |
| 2014/0022615 A1* | 1/2014 | Clemens | .................. | G02B 5/32 359/10 |
| 2014/0043610 A1* | 2/2014 | Engel | ..................... | G01B 11/14 356/369 |
| 2016/0147003 A1* | 5/2016 | Morozov | ............. | G02B 6/0023 359/11 |

\* cited by examiner

*Primary Examiner* — Sonji Johnson
(74) *Attorney, Agent, or Firm* — Muncy, Geissler, Olds & Lowe, P.C.

(57) ABSTRACT

An optical apparatus includes an illumination module, a first structured light generation module, a second structured light generation module and a beam splitting unit. The beam splitting unit is arranged between the illumination module, the first structured light generation module and the second structured light generation module. When a source beam from the illumination module is received by the beam splitting unit, the source beam is split into a first light beam and a second light beam. The first light beam is propagated in a direction toward the first structured light generation module. The second light beam is propagated in a direction toward the second structured light generation module. After the first light beam passes through the first structured light generation module, a first structured light is generated. After the second light beam passes through the second structured light generation module, a second structured light is generated.

19 Claims, 13 Drawing Sheets

OPTICAL APPARATUS

FIELD OF THE INVENTION

The present invention relates to an optical apparatus, and more particularly to an optical apparatus for generating a structured light.

BACKGROUND OF THE INVENTION

With the development of electronic industries and the advance of industrial technologies, various electronic products are designed toward small size, light weightiness and easy portability. Consequently, these electronic products can be applied to mobile business, entertainment or leisure purposes whenever or wherever the users are. In recent years, the manufacturers pay much attention on the integration and application of mechanic, optical and electrical technologies. Consequently, various kinds of optical apparatuses (e.g., image pickup devices or illuminating devices) are widely applied to various electronic products such as smart phones, wearable electronic products or any other small-sized and portable electronic products. Consequently, the users can takes these electronic products whenever they need. In other words, these electronic products not only have important commercial values but also provide more colorful lives to people.

Moreover, with the increase of the living quality, people hope that the electronic products have diversified functions. Consequently, the optical apparatuses for the electronic products have to meet more demands. For meeting these demands, some techniques about a structured light have been disclosed. For example, in Taiwanese Patent No. 104115679, the applicant of this application discloses a technique of using an optical apparatus to output a structured light to detect the under-test surface in order to acquire the distance and flatness of the under-test surface. Moreover, in a co-pending Taiwanese Patent No. 104115677, the applicant of the present invention discloses a technique of using an optical apparatus to output two structured lights to detect the under-test object in order to acquire the accurate depth information.

However, as the demands are gradually increased, the electronic product has to install plural optical apparatuses to output different structured lights to correspondingly provide plural functions. Under this circumstance, the electronic product cannot achieve the purpose of small size, light weightiness and easy portability. Therefore, it is important to provide diversified functions to the electronic product without increasing the volume of the electronic product.

SUMMARY OF THE INVENTION

An object of the present invention provides an optical apparatus for overcoming the drawbacks of the conventional technologies. The optical apparatus is capable of outputting structured lights with the same pattern or different patterns at the same time.

In accordance with an aspect of the present invention, there is provided an optical apparatus. The optical apparatus includes an illumination module, a first structured light generation module, a second structured light generation module, and a beam splitting unit. The illumination module provides a source beam. The beam splitting unit is arranged between the illumination module, the first structured light generation module and the second structured light generation module. When the source beam is received by the beam splitting unit, the source beam is split into a first light beam and a second light beam. The first light beam is propagated in a direction toward the first structured light generation module. The second light beam is propagated in a direction toward the second structured light generation module. A first structured light is generated after the first light beam passes through the first structured light generation module. A second structured light is generated after the second light beam passes through the second structured light generation module.

In an embodiment, the illumination module includes a light source. The light source includes a laser diode, a light emitting diode and/or an organic light emitting diode.

In an embodiment, the illumination module further includes a collimating unit. The collimating unit is arranged between the light source and the beam splitting unit. After a light beam passes through the collimating unit, the light beam is collimated by the collimating unit and directed to the beam splitting unit.

In an embodiment, the illumination module further includes a beam expansion unit. The beam expansion unit is arranged between the light source and the collimating unit. After a light beam passes through the beam expansion unit, the light beam is expanded by the beam expansion unit and directed to the collimating unit.

In an embodiment, the source beam has a wavelength in a first wavelength range, a second wavelength range and/or a thermal band.

In an embodiment, the beam splitting unit is a polygonal block-type beam splitter, and the polygonal block-type beam splitter has a first surface and a second surface. A ridge line is arranged between the first surface and the second surface. The ridge line of the polygonal block-type beam splitter faces an incident direction of the source beam. The first light beam is generated after a first-portion beam of the source beam is reflected by the first surface. The second light beam is generated after a second-portion beam of the source beam is reflected by the second surface.

In an embodiment, the polygonal block-type beam splitter is a polygonal pyramid or a polygonal prism.

In an embodiment, the beam splitting unit has an aspheric surface, and a top part of the aspheric surface faces an incident direction of the source beam. After the source beam is reflected by the aspheric surface, the first light beam and the second light beam are generated.

In an embodiment, the first structured light generation module includes a first structured light output unit. The first structured light output unit includes a first diffractive optical element, a first refractive optical element and/or a first reflective optical element.

In an embodiment, the first structured light generation module further includes a first collimating unit. The first collimating unit is arranged between the first structured light output unit and the beam splitting unit. After the first light beam from the beam splitting unit is collimated by the first collimating unit, the collimated first light beam is directed to the first structured light output unit.

In an embodiment, the second structured light generation module includes a second structured light output unit. The second structured light output unit includes a second diffractive optical element, a second refractive optical element and/or a second reflective optical element.

In an embodiment, the second structured light generation module further includes a second collimating unit. The second collimating unit is arranged between the second structured light output unit and the beam splitting unit. After the second light beam from the beam splitting unit is collimated by the second collimating unit, the collimated second light beam is directed to the second structured light output unit.

In an embodiment, the optical apparatus further includes a casing with a first output port and a second output port. The illumination module and the beam splitting unit are accommodated within the casing. The first structured light generation module is installed in the first output port. The second structured light generation module is installed in the second output port.

In an embodiment, at least one of the first structured light generation module and the second structured light generation module is a film-type component.

In an embodiment, when the first structured light is projected on a projection surface, a first structured light pattern is formed on the projection surface. The first structured light pattern includes a point pattern set, a stripe pattern set and/or a grid pattern set.

In an embodiment, when the second structured light is projected on a projection surface, a second structured light pattern is formed on the projection surface. The second structured light pattern comprises a point pattern set, a stripe pattern set and/or a grid pattern set.

In an embodiment, when the source beam is received by the beam splitting unit, a portion of the source beam is transmitted through the beam splitting unit, so that a third light beam is outputted from the beam splitting unit.

In an embodiment, the first structured light and the second structured light are coherent with each other. When the first structured light and the second structured light are projected on a projection surface, at least one interference fringe is formed on the projection surface.

In an embodiment, the illumination module further includes a light source, and the first structured light and the second structured light are overlapped with each other within the same coherence length L, so that the at least one interference fringe is formed on the projection surface. The coherence length L satisfies a mathematic formula:

$$L = \frac{1}{\Delta\lambda} \cdot \left(\frac{c}{n}\right)$$

wherein $\Delta\lambda$ is an effective spectral linewidth of the light source, c is a light speed, and n is a medium refractive index.

In an embodiment, the first structured light and the second structured light are intermittently coherent with each other according to a predetermined time sequence, so that the at least one interference fringe is intermittently formed on the projection surface.

In an embodiment, the at least one interference fringe provides spatial recognition and/or temporal recognition.

From the above descriptions, the present invention can output plural structured lights with the same pattern or different patterns through a single optical apparatus. The electronic product with the single optical apparatus of the present invention can provide many different functions. Consequently, the electronic product can be designed toward small size, light weightiness and easy portability. Moreover, the optical apparatus can increase the coherence between plural structured lights. Consequently, plural interference fringes are formed on the overlap region of the structured light patterns of the plural structured lights. Consequently, the spatial recognition resolution and/or the temporal recognition resolution will be enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
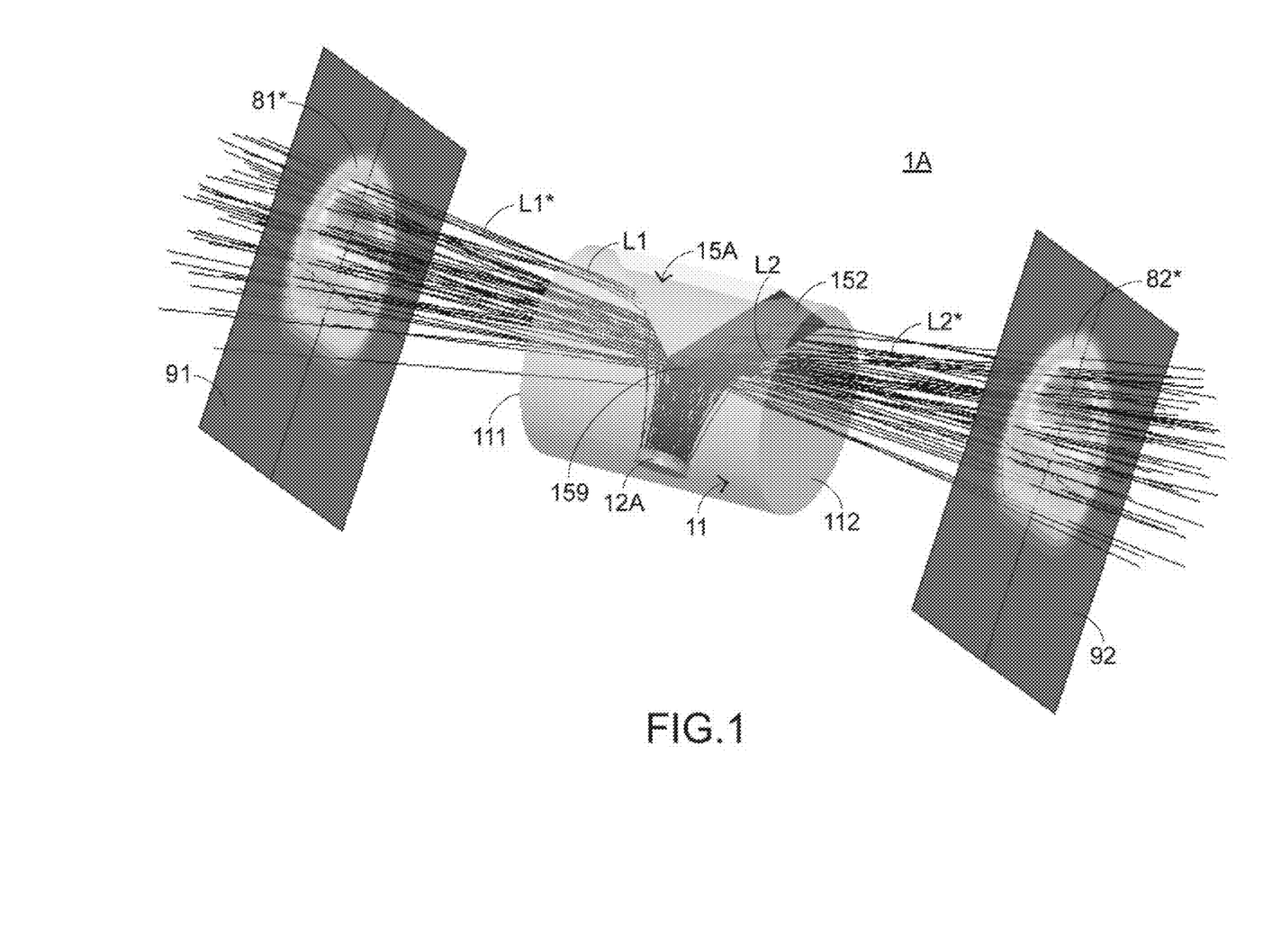
FIG. 1 schematically illustrates the operations of an optical apparatus according to a first embodiment of the present invention.
Figure 2:
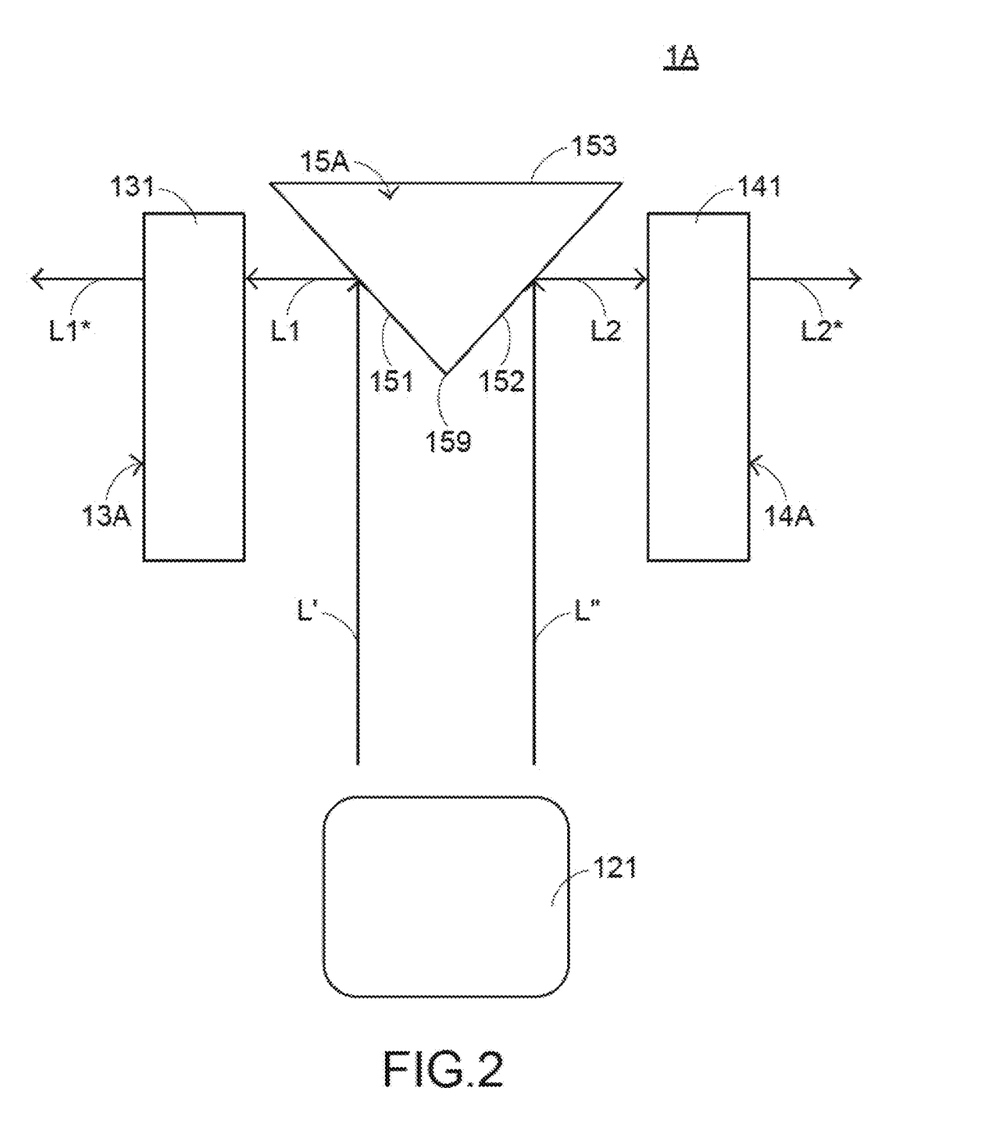
FIG. 2 schematically illustrates the layout of some components of the optical apparatus of FIG. 1.

Please refer to FIGS. 1 and 2. FIG. 1 schematically illustrates the operations of an optical apparatus according to a first embodiment of the present invention. FIG. 2 schematically illustrates the layout of some components of the optical apparatus of FIG. 1. The optical apparatus 1A comprises a casing 11, an illumination module 12A, a first structured light generation module 13A, a second structured light generation module 14A, and a beam splitting unit 15A. The illumination module 12A and the beam splitting unit 15A are accommodated within the casing 11. Moreover, the casing 11 further has a first output port 111 and a second output port 112. The first structured light generation module 13A and the second structured light generation module 14A are installed in the first output port 111 and the second output port 112, respectively. The beam splitting unit 15A is arranged between the illumination module 12A, the first structured light generation module 13A and the second structured light generation module 14A. When a source beam L from the illumination module 12A is received by the beam splitting unit 15A, the source beam L is split into a first light beam L1 and a second light beam L2. The first light beam L1 is propagated in a direction toward the first structured light generation module 13A. The second light beam L2 is propagated in a direction toward the second structured light generation module 14A. Moreover, each of the source beam L, the first light beam L1 and the second light beam L2 is in a single-beam form or a multiple-beam form.

Moreover, the illumination module 12A comprises a light source 121. In an embodiment, the light source 121 comprises a laser diode (LD), a light emitting diode (LED), an organic light emitting diode (OLED), and/or or any other comparable semiconductor-type light-emitting element similar to the laser diode, the light emitting diode or the organic light emitting diode. The wavelength of the source beam L from the light source 121 is in a first wavelength range and/or a second wavelength range. For example, the source beam from the light source 121 is a visible beam, an invisible beam (e.g., an ultraviolet beam, an infrared beam, a near infrared beam or a far infrared beam), or a light beam in a thermal band.

In this embodiment, the beam splitting unit 15A is a trilateral prism (i.e., a triangular prism). The beam splitting unit 15A has a first surface 151, a second surface 152 and a third surface 153. A ridge line 159 is arranged between the first surface 151 and the second surface 152. The first surface 151 and the second surface 152 are high reflection surfaces. For example, each of the first surface 151 and the second surface 152 has a high reflection coating. The ridge line 159 of the beam splitting unit 15A faces the incident direction of the source beam L. In other words, a first-portion beam L' of the source beam L and a second-portion beam L" of the source beam L are directed to the first surface 151 and the second surface 152, respectively. After the first-portion beam L' is reflected by the first surface 151, the first light beam L1 is generated. After the second-portion beam L" is reflected by the second surface 152, the second light beam L2 is generated.

The first structured light generation module 13A comprises a first structured light output unit 131. The first structured light output unit 131 is a first diffractive optical element (DOE). After the first light beam L1 passes through the first structured light output unit 131, a first structured light L1* is outputted. When the first structured light L1* is projected on a first projection surface 91, a first structured light pattern 81* is formed on the first projection surface 91. Similarly, the second structured light generation module 14A comprises a second structured light output unit 141. The second structured light output unit 141 is a second diffractive optical element. After the second light beam L2 passes through the second structured light output unit 141, a second structured light L2* is outputted. When the second structured light L2* is projected on a second projection surface 92, a second structured light pattern 82* is formed on the second projection surface 92. Preferably but not exclusively, the first diffractive optical element and the second diffractive optical element are optical diffractive films. Consequently, the volume of the optical apparatus 1A is minimized.

Moreover, the first diffractive optical element and the second diffractive optical element are designed according to the practical requirements. When the first light beam L1 passes through the first diffractive optical element and the second light beam L2 passes through the second diffractive optical element, the first light beam L1 and the second light beam L2 are respectively shaped by the first diffractive optical element and the second diffractive optical element. Consequently, the first structured light L1* outputted from the first structured light output unit 131 and the second structured light L2* outputted from the second structured light output unit 141 can be flexibly adjusted. In other words, the first structured light pattern 81* on the first projection surface 91 and the second structured light pattern 82* on the second projection surface 92 can be designed. Moreover, the first structured light pattern 81* and the second structured light pattern 82* can be designed to be identical or different.

Figure 3A:
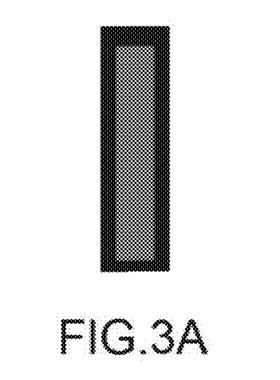
FIG. 3A schematically illustrates a stripe-like pattern of the structured light.
Figure 3B:
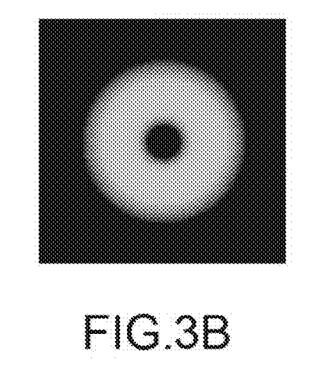
FIG. 3B schematically illustrates a vortex ring pattern of the structured light.
Figure 3C:
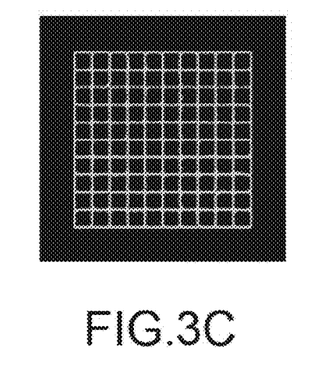
FIG. 3C schematically illustrates the grid pattern of the structured light.
Figure 3D:
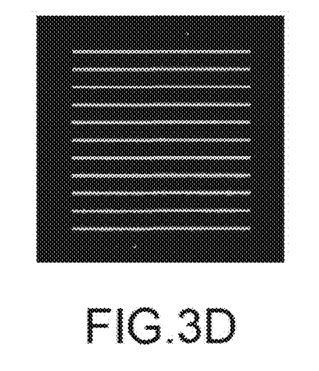
FIG. 3D schematically illustrates a multiple-stripe pattern of the structured light.
Figure 3E:
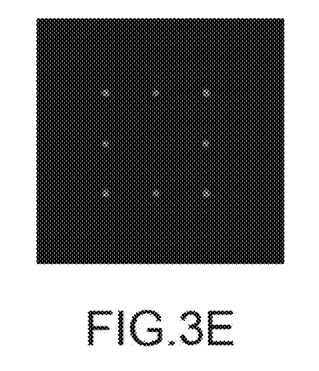
FIG. 3E schematically illustrates a multiple-dot pattern of the structured light in a rectangular arrangement.
Figure 3F:
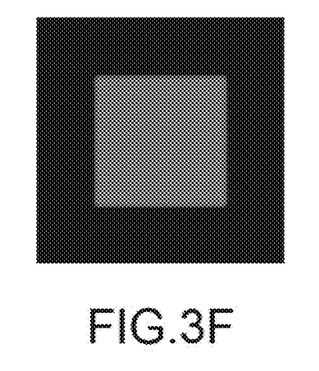
FIG. 3F schematically illustrates a rectangular-plane pattern of the structured light.

The first structured light pattern 81* and the second structured light pattern 82* as shown in FIG. 1 are presented herein for purpose of illustration and description only. For example, the first structured light pattern or the second structured light pattern comprises a point pattern set, a stripe pattern set and/or a grid pattern set. FIGS. 3A-3F schematically illustrate six exemplary structured light patterns. It is noted that the examples of the structured light patterns are not restricted. FIG. 3A schematically illustrates a stripe-like pattern of the structured light. FIG. 3B schematically illustrates a vortex ring pattern of the structured light. FIG. 3C schematically illustrates the grid pattern of the structured light. FIG. 3D schematically illustrates a multiple-stripe pattern of the structured light. FIG. 3E schematically illustrates a multiple-dot pattern of the structured light in a rectangular arrangement. FIG. 3F schematically illustrates a rectangular-plane pattern of the structured light.

The ways of designing the first diffractive optical element and the second diffractive optical element and outputting the first structured light L1* and the second structured light L2* through the first diffractive optical element and the second diffractive optical element are well known to those skilled in the art, and are not redundantly described herein.

It is noted that the ways of generating the first structured light L1* and the second structured light L2* are not restricted. For example, in another embodiment, the first structured light output unit 131 comprises a first refractive optical element (not shown) and/or a first reflective optical element (not shown) for allowing the first light beam L1 to pass through and outputting the first structured light L1*. Similarly, in another embodiment, the second structured light output unit 141 comprises a second refractive optical element (not shown) and/or a second reflective optical element (not shown) for allowing the second light beam L2 to pass through and outputting the second structured light L2*.

Figure 4:
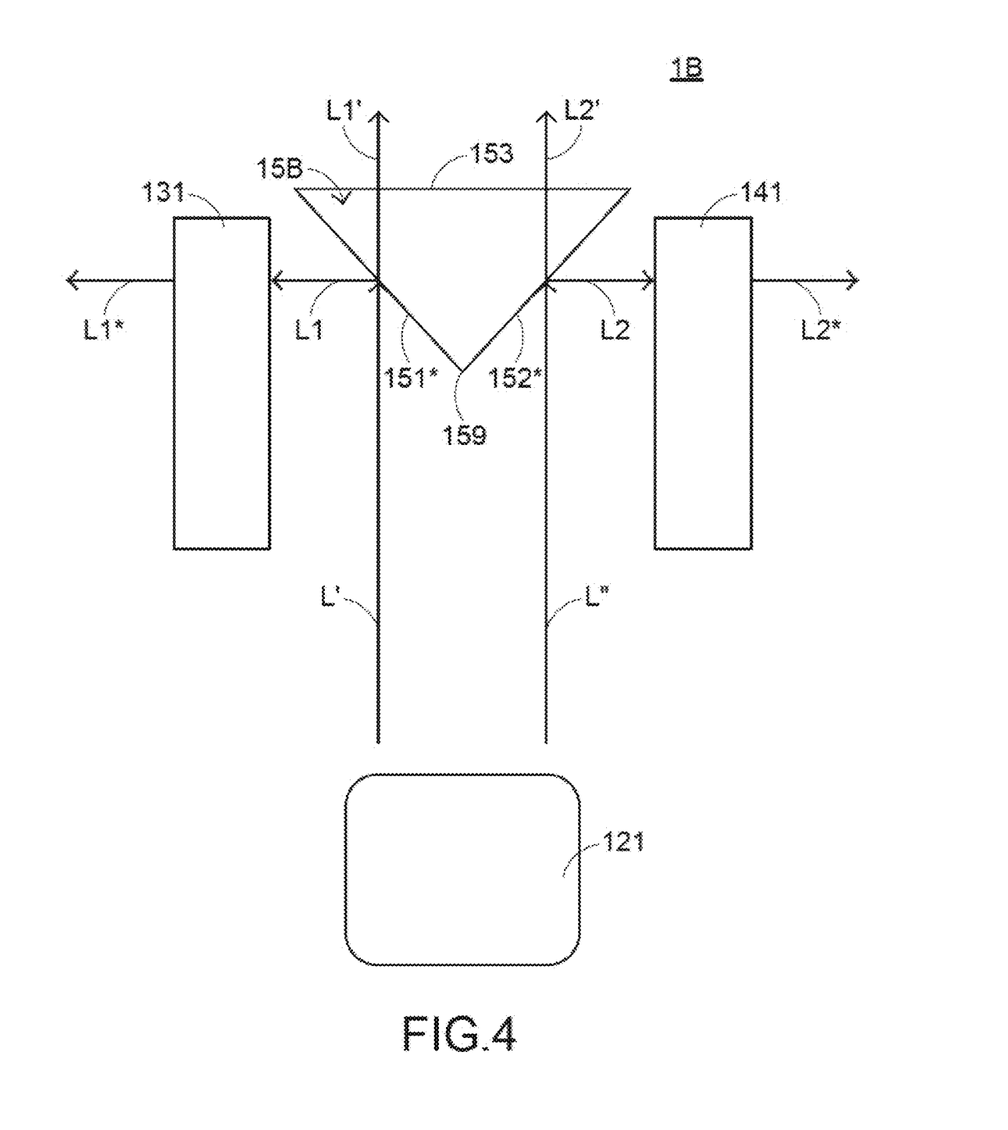
FIG. 4 schematically illustrates the layout of some components of an optical apparatus according to a second embodiment of the present invention.

FIG. 4 schematically illustrates the layout of some components of an optical apparatus according to a second embodiment of the present invention. The structure and function of the optical apparatus 1B that are similar to those of the first embodiment are not redundantly described herein. In comparison with the first embodiment, each of the first surface 151* and the second surface 152* of the beam splitting unit 15B has a specified transmittance value. For example, the first surface 151* and the second surface 152* of the beam splitting unit 15B are thin films with specified transmittance values. The transmittance values are determined according to the practical requirements. Consequently, when the first-portion beam L' of the source beam L is directed to the first surface 151*, a part of the first-portion beam L' is reflected by the first surface 151* to generate the first light beam L1, and another part of the first-portion beam L' (L1') passes through the first surface 151* and travels in the direction toward the third surface 153. Similarly, when the second-portion beam L" of the source beam L is directed to the second surface 152*, a part of the second-portion beam L" is reflected by the second surface 152* to generate the second light beam L2, and another part of the second-portion beam L" (L2') passes through the second surface 152* and travels in the direction toward the third surface 153. In this embodiment, the casing (not shown, but with reference to FIG. 1) further has a third output port (not shown). After the light beams L1' and L2' pass through the third surface 153 of the beam splitting unit 15B, a third structured light is outputted.

Figure 5:
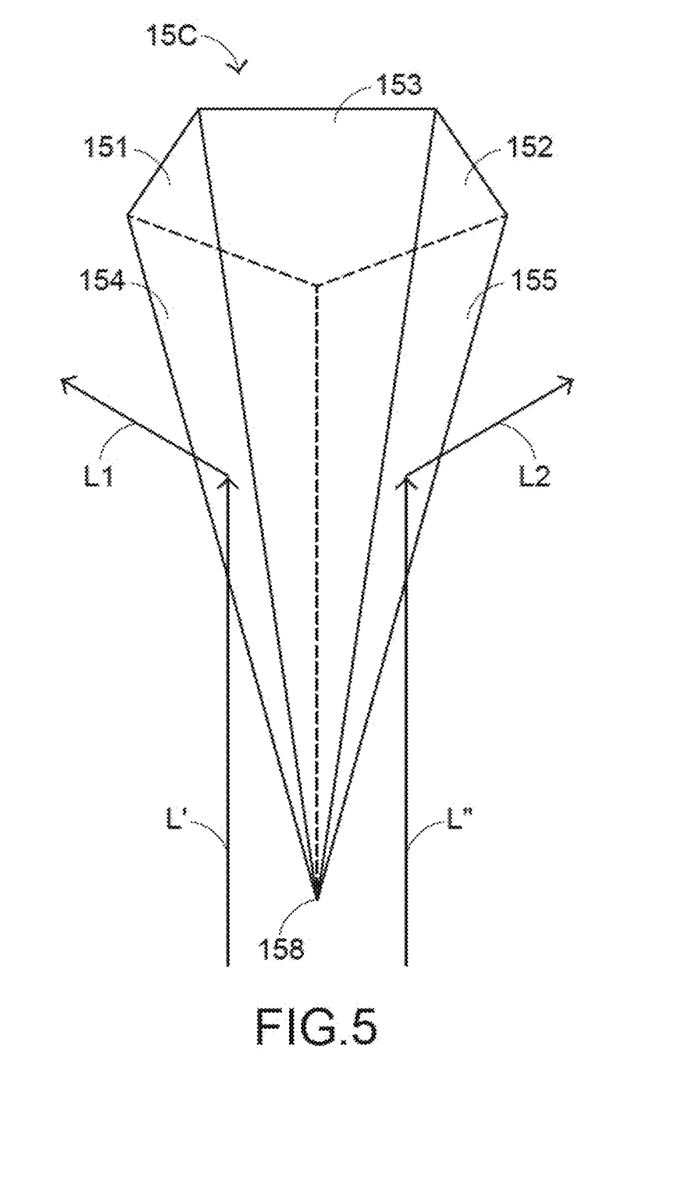
FIG. 5 schematically illustrates a beam splitting unit of an optical apparatus according to a third embodiment of the present invention.

FIG. 5 schematically illustrates a beam splitting unit of an optical apparatus according to a third embodiment of the present invention. The structure and function of the optical apparatus of this embodiment that are similar to those of the above embodiments are not redundantly described herein. In comparison with the above embodiments, the beam splitting unit 15C is a pentagonal pyramid with a first surface 151, a second surface 152, a third surface 153, a fourth surface 154 and a fifth surface 155. A vertex 158 of the pentagonal pyramid of the beam splitting unit 15C (i.e., the point whether the five surfaces 151~155 meet) faces the incident direction of the source beam L. Consequently, a first-portion beam L' of the source beam L, a second-portion beam L" of the source beam L, a third-portion beam (not shown) of the source beam L, a fourth-portion beam (not shown) of the source beam L and a fifth-portion beam (not shown) of the source beam L are directed to the first surface 151, the second surface 152, the third surface 153, the fourth surface 154 and the fifth surface 155, respectively. After the first-portion beam L', the second-portion beam L", the third-portion beam, the fourth-portion beam and the fifth-portion beam are respectively reflected by the first surface 151, the second surface 152, the third surface 153, the fourth surface 154 and the fifth surface 155, a first light beam L1, a second light beam L2, a third light beam (not shown), a fourth light beam (not shown) and a fifth light beam (not shown) are generated.

In this embodiment, the casing (not shown, but with reference to FIG. 1) further comprises a third output port (not shown) corresponding to the third surface 153 of the beam splitting unit 15C, a fourth output port (not shown) corresponding to the fourth surface 153 of the beam splitting unit 15C and a fifth output port (not shown) corresponding to the fifth surface 155 of the beam splitting unit 15C. A third structured light generation module (not shown, but similar to the first structured light generation module 13A and the second structured light generation module 14A of FIG. 2) is installed in the third output port. A fourth structured light generation module (not shown, but similar to the first structured light generation module 13A and the second structured light generation module 14A of FIG. 2) is installed in the fourth output port. A fifth structured light generation module (not shown, but similar to the first structured light generation module 13A and the second structured light generation module 14A of FIG. 2) is installed in the fourth output port. Consequently, the optical apparatus can output plural (five) structured lights in different (five) directions.

In the above embodiments, the shapes and structures of the beam splitting units 15A, 15B and 15C are presented herein for purpose of illustration and description only. The shapes and structures of the beam splitting units may be designed to be any polygonal block-type beam splitter according to the practical requirements. For example, the beam splitting units are polygonal pyramids or polygonal prisms.

Figure 6:
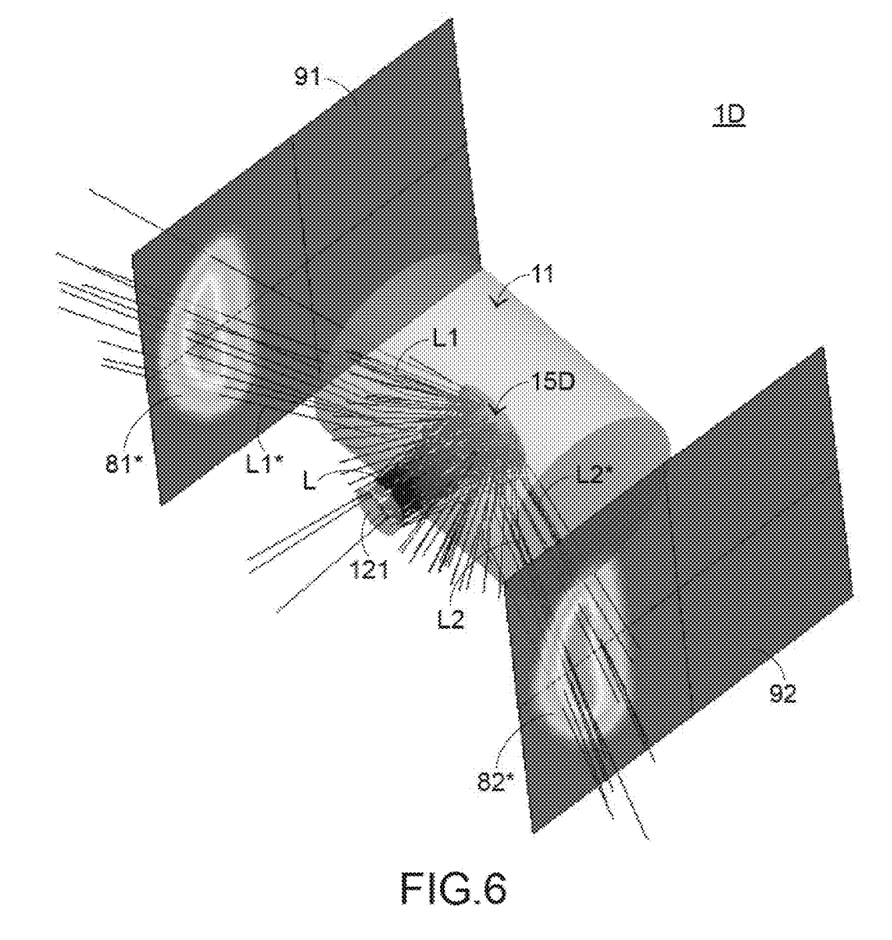
FIG. 6 schematically illustrates the operations of an optical apparatus according to a fourth embodiment of the present invention.
Figure 7:
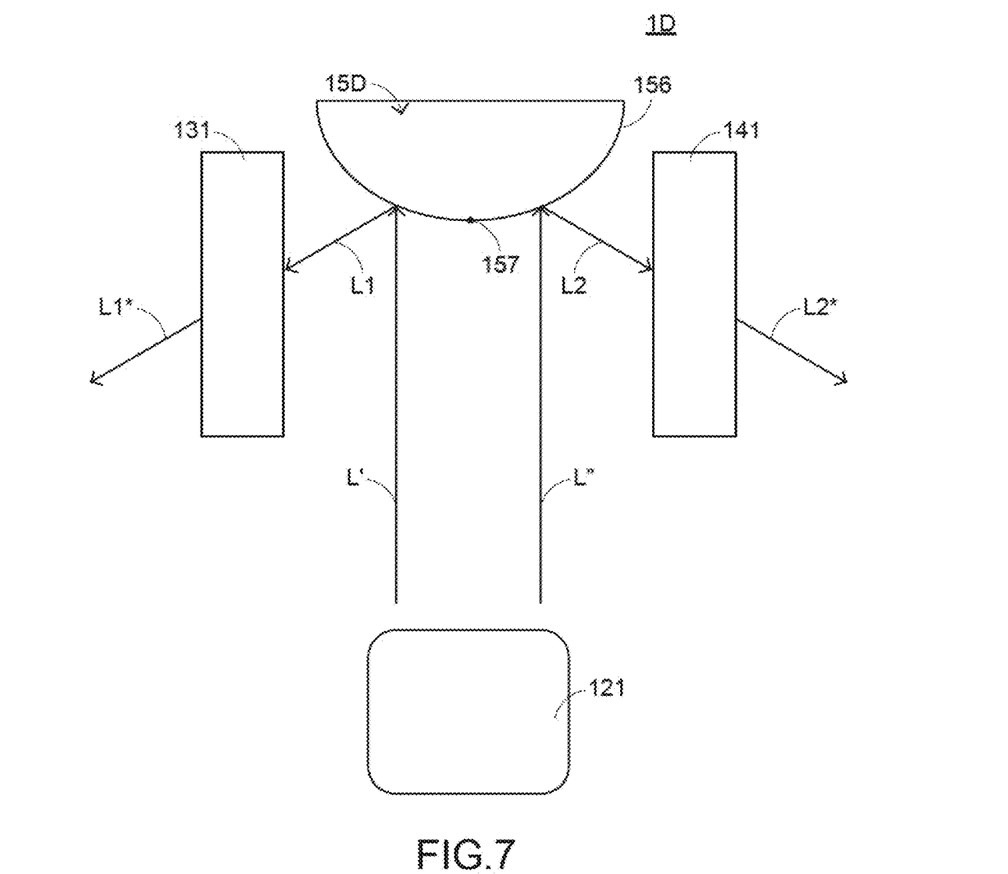
FIG. 7 schematically illustrates the beam splitting unit of the optical apparatus of FIG. 6.

Please refer to FIGS. 6 and 7. FIG. 6 schematically illustrates the operations of an optical apparatus according to a fourth embodiment of the present invention. FIG. 7 schematically illustrates the beam splitting unit of the optical apparatus of FIG. 6. The structure and function of the optical apparatus 1D of this embodiment that are similar to those of the above embodiments are not redundantly described herein. In comparison with the above embodiments, the beam splitting unit 15D has an aspheric surface 156. A top part 157 of the aspheric surface 156 faces the incident direction of the source beam L. After the first-portion beam L' and the second-portion beam L" are respectively reflected by the aspheric surface 156, the first light beam L1 and the second light beam L2 are generated. Consequently, the first structured light L1* is outputted and projected on the first projection surface 91, a first structured light pattern 81* is formed on the first projection surface 91. Similarly, after the second structured light L2* is projected on the second projection surface 92, the second structured light pattern 82* is formed on the second projection surface 92.

Figure 8:
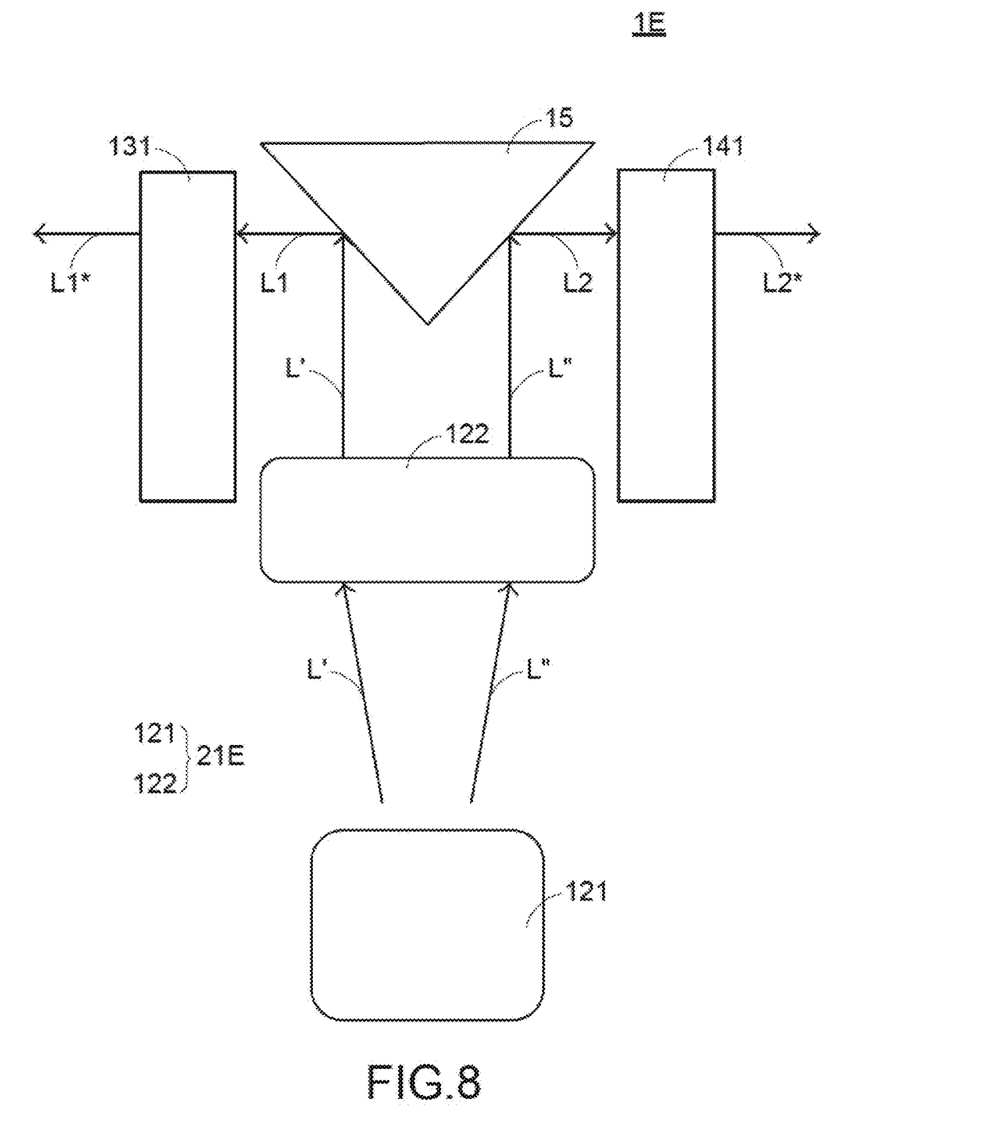
FIG. 8 schematically illustrates the layout of some components of an optical apparatus according to a fifth embodiment of the present invention.

FIG. 8 schematically illustrates the layout of some components of an optical apparatus according to a fifth embodiment of the present invention. The structure and function of the optical apparatus 1E that are similar to those of the above embodiments are not redundantly described herein. In comparison with the above embodiments, the illumination module 12E further comprises a collimating unit 122. The collimating unit 122 is arranged between the light source 121 and the beam splitting unit 15. After the source light L from the light source 121 passes through the collimating unit 122, parallel collimated beams are directed to the beam splitting unit 15.

As known, if the source beam is not collimated, a portion of the source beam is not utilized by the beam splitting unit 15. In this embodiment, the first-portion beam L' and the second-portion beam L" from the light source 121 are collimated by the collimating unit 122, the first-portion beam L' and the second-portion beam L" are in parallel with each other and directed to the beam splitting unit 15. Consequently, the light utilization efficiency of the optical apparatus 1E is enhanced.

Figure 9:
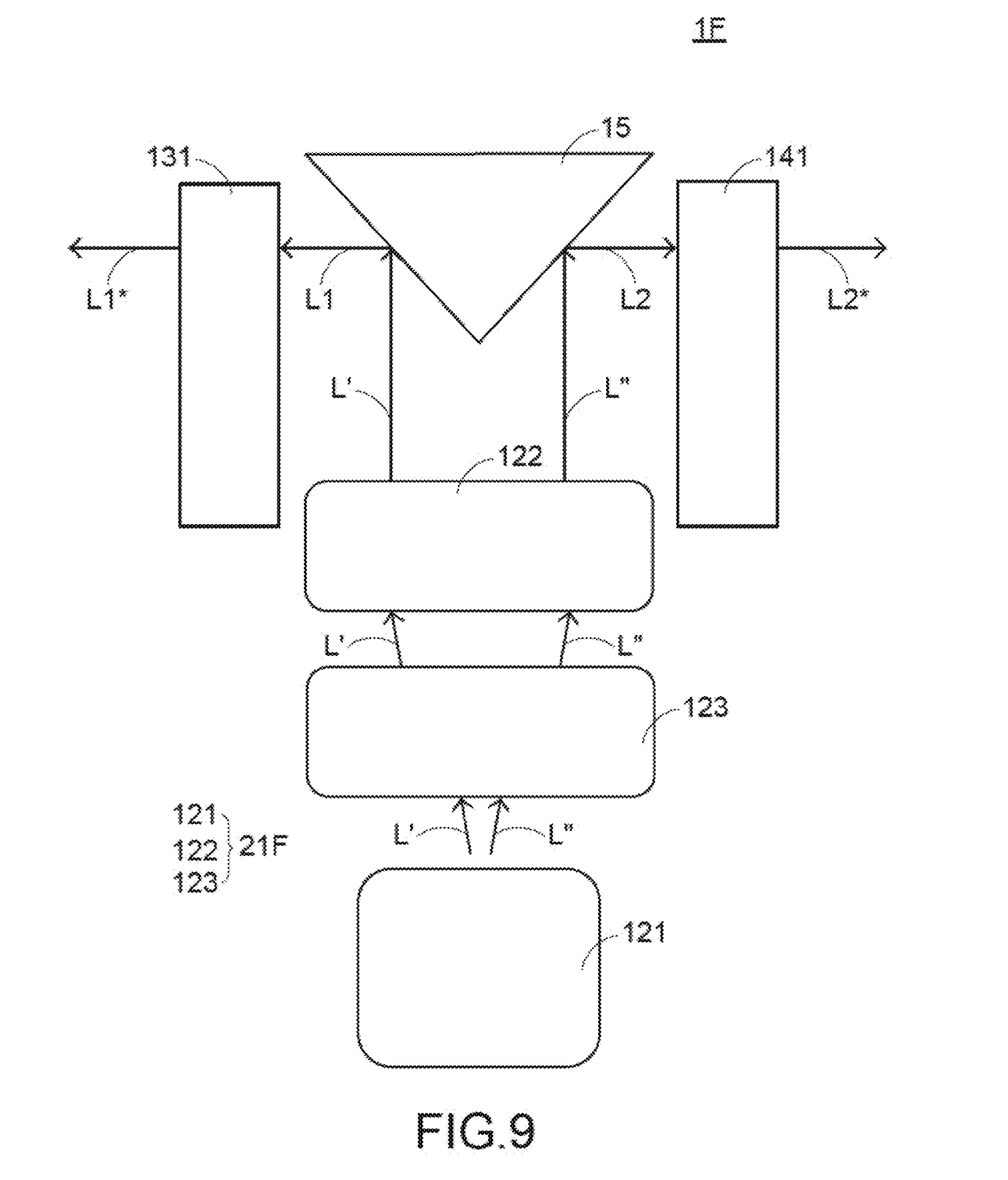
FIG. 9 schematically illustrates the layout of some components of an optical apparatus according to a sixth embodiment of the present invention.

FIG. 9 schematically illustrates the layout of some components of an optical apparatus according to a sixth embodiment of the present invention. The structure and function of the optical apparatus 1F that are similar to those of the fifth embodiment are not redundantly described herein. In comparison with the fifth embodiment, the illumination module 12E further comprises a beam expansion unit 123. The beam expansion unit 123 is arranged between the light source 121 and the collimating unit 122. After the first-portion beam L' and the second-portion beam L" from the light source 121 are expanded by the beam expansion unit 123, the expanded first-portion beam L' and the expanded second-portion beam L" are directed to the collimating unit 122. Consequently, the available beam area is widened.

Figure 10:
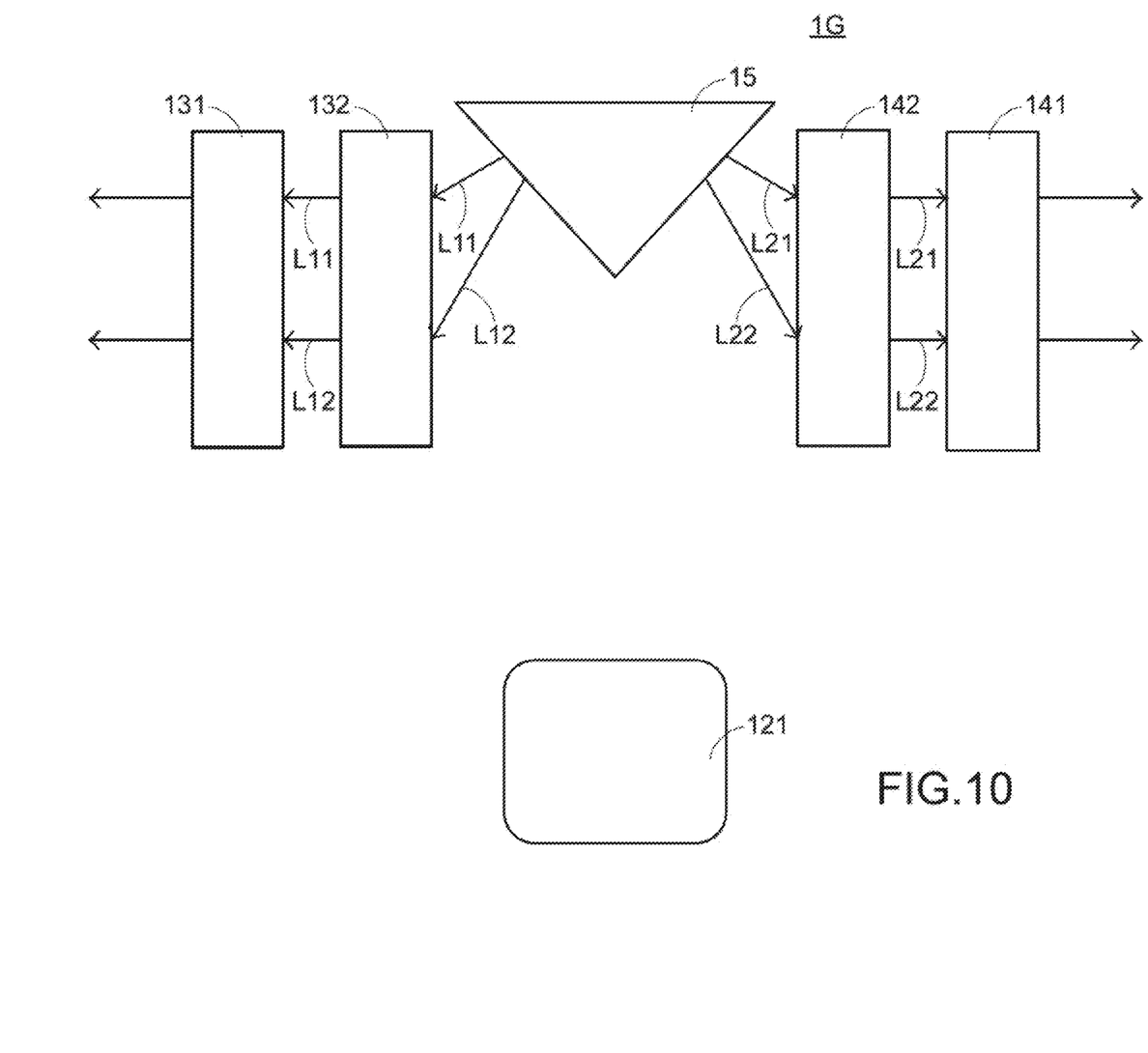
FIG. 10 schematically illustrates the layout of some components of an optical apparatus according to a seventh embodiment of the present invention.

FIG. 10 schematically illustrates the layout of some components of an optical apparatus according to a seventh embodiment of the present invention. The structure and function of the optical apparatus 1G that are similar to those of the above embodiments are not redundantly described herein. In comparison with the above embodiments, the first structured light generation module 13G further comprises a first collimating unit 132. The first collimating unit 132 is arranged between the first structured light output unit 131 and the beam splitting unit 15. Moreover, the second structured light generation module 14G further comprises a second collimating unit 142. The second collimating unit 142 is arranged between the second structured light output unit 141 and the beam splitting unit 15. After the first light beams L11 and L12 from the beam splitting unit 15 are collimated by the first collimating unit 132, the collimated light beams L11 and L12 are directed to the first structured light output unit 131. After the light beams L21 and L22 from the beam splitting unit 15 are collimated by the second collimating unit 142, the collimated light beams L21 and L22 are directed to the second structured light output unit 141.

As known, if the first light beam is not collimated, a portion of the first light beam is not utilized by the first structured light output unit 131. Similarly, if the second light beam is not collimated, a portion of the second light beam is not utilized by the second structured light output unit 141. In this embodiment, the first collimating unit 132 is arranged between the first structured light output unit 131 and the beam splitting unit 15, and the second collimating unit 142 is arranged between the second structured light output unit 141 and the beam splitting unit 15. Consequently, the light utilization efficiency of the optical apparatus 1G is enhanced.

Figure 11:
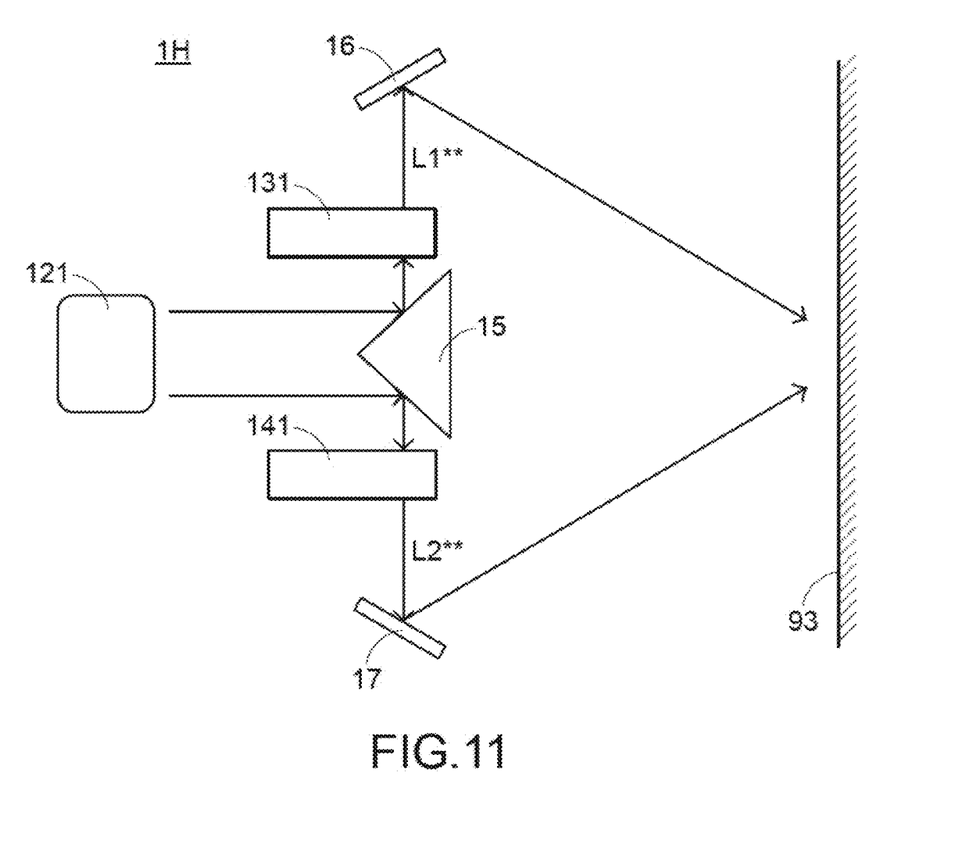
FIG. 11 schematically illustrates the layout of some components of an optical apparatus according to an eighth embodiment of the present invention.
Figure 12:
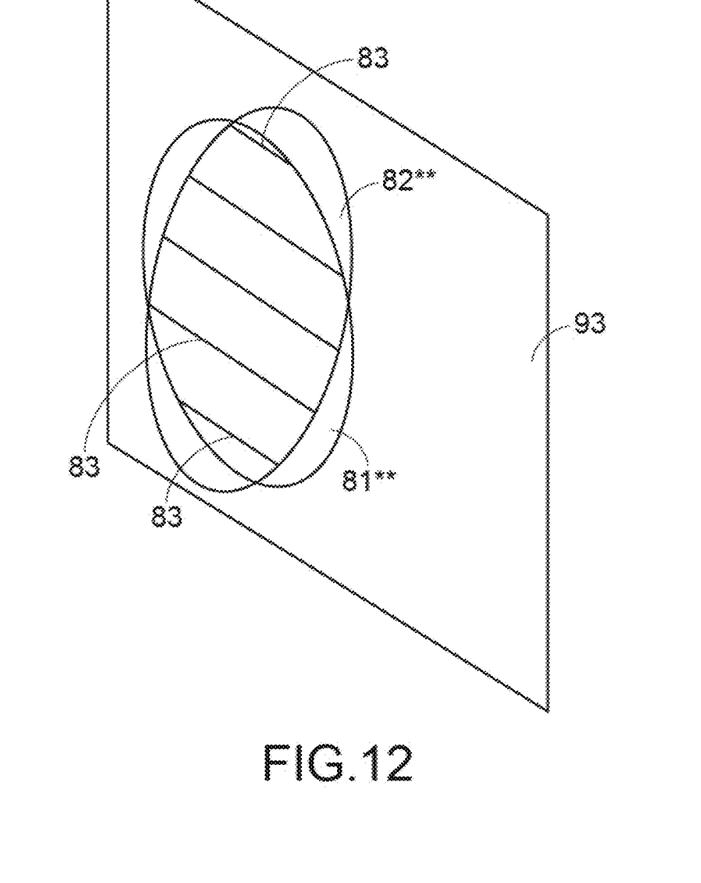
FIG. 12 schematically illustrates the first structured light pattern, the second structured light pattern and plural interference fringes on the projection surface.

Please refer to FIGS. 11 and 12. FIG. 11 schematically illustrates the layout of some components of an optical apparatus according to an eighth embodiment of the present invention. FIG. 12 schematically illustrates the first structured light pattern, the second structured light pattern and plural interference fringes on the projection surface. The structure and function of the optical apparatus 1H that are similar to those of the above embodiments are not redundantly described herein. In comparison with the above embodiments, the optical apparatus 1H further comprises a first light guiding unit 16 and a second light guiding unit 17. The first light guiding unit 16 and the second light guiding unit 17 are located at the outside of the casing (not shown, but with reference to FIG. 1). The first light guiding unit 16 and the second light guiding unit 17 are used for guiding the first structured light L1 and the second structured light L2 to the same projection surface 93. Consequently, the first structured light pattern 81 and the second structured light pattern 82 are formed on the projection surface 93. In this embodiment, the first structured light L1 and the second structured light L2 are coherent with each other. Under this circumstance, the overlap region of the first structured light pattern 81 and the second structured light pattern 82 on the projection surface 93 have plural interference fringes 83.

Moreover, the first structured light L1 and the second structured light L2 come from the same light source 121. By controlling the output of the light source 121, the coherent properties and the coherence length of the first structured light L1 and the second structured light L2 are enhanced.

Moreover, the plural interference fringes 83 on the overlap region of the first structured light pattern 81 and the second structured light pattern 82 are much thinner than the first structured light L1 and the second structured light L2. As mentioned above, the first structured light pattern 81 and the second structured light pattern 82 can be designed according to the practical requirements. In an embodiment, the gap between any two adjacent interference fringes 83 is very small, for example smaller than 0.1 mm. Consequently, these interference fringes 83 can provide desired solving power (i.e., resolution) of solving features to the optical apparatus 1H or the user. This resolution can be applied to various spatial recognition purposes. That is, the increase of the spatial resolution is helpful to recognize various objects more precisely, for example recognizing the positions and directions of the objects, recognizing the sizes of the objects or recognizing the three-dimensional height difference.

Preferably but not exclusively, the first structured light L1 and the second structured light L2 are overlapped with each other within the same coherence length L. Consequently, the plural interference fringes 83 on the overlap region of the first structured light pattern 81 and the second structured light pattern 82 are further reduced. In an embodiment, the coherence length L satisfies a mathematic formula:

$$L = \frac{1}{\Delta\lambda} \cdot \left(\frac{c}{n}\right)$$

In the above mathematic formula, $\Delta\lambda$ is an effective spectral linewidth of the light source, c is a light speed, and n is a medium refractive index.

Since the first structured light L1 and the second structured light L2 can be intermittently coherent with each other according to a predetermined time sequence under control, the plural interference fringes 83 are intermittently formed on the projection surface 93. That is, in addition to the spatial recognition, the plural interference fringes 83 can be applied to temporal recognition. For example, the light source 121 is turned on at different predetermined time points. After the light source 121 is turned on for a specified time period, the light source 121 is turned off. Consequently, the interference fringes 83 are formed on the projection surfaces at these predetermined time points and continued for the specified time period until the light source 121 is turned off. Consequently, the optical apparatus of the present invention can monitor and identify the response of an object or a biological body at different time segments.

The method of allowing the first structured light L1 and the second structured light L2 to be coherent with each other (e.g., through the wavelengths or the optical path difference) and the method of allowing the first structured light L1 and the second structured light L2 to be intermittently coherent with each other according to the predetermined time sequence are well known to those skilled in the art, and are not redundantly described herein.

From the above descriptions, the present invention can output plural structured lights with the same pattern or different patterns through a single optical apparatus. The electronic product with the single optical apparatus of the present invention can provide many different functions. Consequently, the electronic product can be designed toward small size, light weightiness and easy portability. In other words, the optical apparatus of the present invention is industrially applicable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical apparatus, comprising:
   an illumination module providing a source beam;
   a first structured light generation module;
   a second structured light generation module;
   a beam splitting unit arranged between the illumination module, the first structured light generation module and the second structured light generation module, wherein when the source beam is received by the beam splitting unit, the source beam is split into a first light beam and a second light beam, wherein the first light beam is propagated in a direction toward the first structured light generation module, and the second light beam is propagated in a direction toward the second structured light generation module; and
   a casing with a first output port and a second output port, wherein the illumination module and the beam splitting unit are accommodated within the casing, the first structured light generation module is installed in the first output port, and the second structured light generation module is installed in the second output port,
   wherein a first structured light is generated after the first light beam passes through the first structured light generation module, and a second structured light is generated after the second light beam passes through the second structured light generation module.

2. The optical apparatus according to claim 1, wherein the illumination module comprises a light source, wherein the light source comprises a laser diode, a light emitting diode and/or an organic light emitting diode.

3. The optical apparatus according to claim 2, wherein the illumination module further comprises a collimating unit, wherein the collimating unit is arranged between the light source and the beam splitting unit, wherein after a light beam passes through the collimating unit, the light beam is collimated by the collimating unit and directed to the beam splitting unit.

4. The optical apparatus according to claim 3, wherein the illumination module further comprises a beam expansion unit, wherein the beam expansion unit is arranged between the light source and the collimating unit, wherein after a light beam passes through the beam expansion unit, the light beam is expanded by the beam expansion unit and directed to the collimating unit.

5. The optical apparatus according to claim 1, wherein the source beam has a wavelength in a first wavelength range, a second wavelength range and/or a thermal band.

6. The optical apparatus according to claim 1, wherein the beam splitting unit is a polygonal block-type beam splitter, and the polygonal block-type beam splitter has a first surface and a second surface, wherein a ridge line is arranged between the first surface and the second surface, and the ridge line of the polygonal block-type beam splitter faces an incident direction of the source beam, wherein the first light beam is generated after a first-portion beam of the source beam is reflected by the first surface, and the second light beam is generated after a second-portion beam of the source beam is reflected by the second surface.

7. The optical apparatus according to claim 6, wherein the polygonal block-type beam splitter is a polygonal pyramid or a polygonal prism.

8. The optical apparatus according to claim 1, wherein the beam splitting unit has an aspheric surface, and a top part of the aspheric surface faces an incident direction of the source beam, wherein after the source beam is reflected by the aspheric surface, the first light beam and the second light beam are generated.

9. The optical apparatus according to claim 1, wherein the first structured light generation module comprises a first structured light output unit, wherein the first structured light output unit comprises a first diffractive optical element, a first refractive optical element and/or a first reflective optical element.

10. The optical apparatus according to claim 9, wherein the first structured light generation module further comprises a first collimating unit, wherein the first collimating unit is arranged between the first structured light output unit and the beam splitting unit, wherein after the first light beam from the beam splitting unit is collimated by the first collimating unit, the collimated first light beam is directed to the first structured light output unit.

11. The optical apparatus according to claim 1, wherein the second structured light generation module comprises a second structured light output unit, wherein the second structured light output unit comprises a second diffractive optical element, a second refractive optical element and/or a second reflective optical element.

12. The optical apparatus according to claim 11, wherein the second structured light generation module further comprises a second collimating unit, wherein the second collimating unit is arranged between the second structured light output unit and the beam splitting unit, wherein after the second light beam from the beam splitting unit is collimated by the second collimating unit, the collimated second light beam is directed to the second structured light output unit.

13. The optical apparatus according to claim 1, wherein at least one of the first structured light generation module and the second structured light generation module is a film-type component.

14. The optical apparatus according to claim 1, wherein when the first structured light is projected on a projection surface, a first structured light pattern is formed on the projection surface, wherein the first structured light pattern comprises a point pattern set, a stripe pattern set and/or a grid pattern set.

15. The optical apparatus according to claim 1, wherein when the second structured light is projected on a projection surface, a second structured light pattern is formed on the projection surface, wherein the second structured light pattern comprises a point pattern set, a stripe pattern set and/or a grid pattern set.

16. The optical apparatus according to claim 1, wherein when the source beam is received by the beam splitting unit, a portion of the source beam is transmitted through the beam splitting unit, so that a third light beam is outputted from the beam splitting unit.

17. The optical apparatus according to claim 1, wherein the first structured light and the second structured light are coherent with each other, wherein when the first structured light and the second structured light are projected on a projection surface, at least one interference fringe is formed on the projection surface.

18. The optical apparatus according to claim 17, wherein the first structured light and the second structured light are intermittently coherent with each other according to a predetermined time sequence, so that the at least one interference fringe is intermittently formed on the projection surface.

19. The optical apparatus according to claim 17, wherein the at least one interference fringe provides spatial recognition and/or temporal recognition.

* * * * *